United States Patent
Nagahama et al.

(10) Patent No.: US 9,442,790 B2
(45) Date of Patent: Sep. 13, 2016

(54) COMPUTER AND DUMPING CONTROL METHOD

(71) Applicant: FUJITSU LIMITED, Kawasaki-shi, Kanagawa (JP)

(72) Inventors: Yuichi Nagahama, Numazu (JP); Hidetoshi Seto, Nagaizumi (JP); Yasuo Ueda, Numazu (JP); Hideyuki Niwa, Numazu (JP); Yasuaki Ishimatsu, Numazu (JP); Taku Izumi, Numazu (JP); Hiroyuki Kamezawa, Numazu (JP); Kenji Kaneshige, Gotemba (JP); Ken Ichikawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 14/328,929

(22) Filed: Jul. 11, 2014

(65) Prior Publication Data
US 2015/0046754 A1 Feb. 12, 2015

(30) Foreign Application Priority Data
Aug. 7, 2013 (JP) .................................. 2013-164190

(51) Int. Cl.
G06F 11/00 (2006.01)
G06F 11/07 (2006.01)
G06F 11/30 (2006.01)

(52) U.S. Cl.
CPC ........ *G06F 11/0778* (2013.01); *G06F 11/0706* (2013.01); *G06F 11/3037* (2013.01)

(58) Field of Classification Search
CPC ............ G06F 11/0706; G06F 11/0778; G06F 11/3037
See application file for complete search history.

(56) References Cited

U.S. PATENT DOCUMENTS

| 5,809,542 A * | 9/1998 | Tsuboi ................ G06F 11/1402 711/112 |
| 2006/0168471 A1 * | 7/2006 | Schulstad ........... G06F 11/0727 714/6.11 |

FOREIGN PATENT DOCUMENTS

| JP | 64-076234 | 3/1989 |
| JP | 02-85938 | 3/1990 |
| JP | 2000-132432 | 5/2000 |
| JP | 2004-280140 | 10/2004 |

* cited by examiner

*Primary Examiner* — Michael Maskulinski
*Assistant Examiner* — Anthony J Amoroso
(74) *Attorney, Agent, or Firm* — Fujitsu Patent Center (57) ABSTRACT

A circuitry of a computer is configured to monitor an update state in a prescribed period of time of a plurality of units of management of data stored in the memory device for each of the plurality of units, to select a target unit as a target of dumping that outputs data from among the plurality of units on the basis of a monitoring result of the update state, and to dump data corresponding to the selected target unit.

4 Claims, 10 Drawing Sheets

| PAGE # | OS ACCESS SETTING | DUMP ACCESS SETTING |
|---|---|---|
| 0 | Read Only | Read/Write |
| 1 | Read/Write | Read/Write |
| 2 | Read/Write | Read/Write |
| 3 | Read Only | Read Only |
| 4 | Read/Write | Read Only |
| ⋮ | ⋮ | |

| PAGE # | OS ACCESS SETTING | DUMP ACCESS SETTING | STABILITY COUNTER VALUE | DUMP MANAGEMENT FLAG |
|---|---|---|---|---|
| 0 | Read/Write | Read Only | 0 | 1 |
| 1 | Read/Write | Read/Write | 3 | 0 |
| 2 | Read/Write | Read Only | 3 | 0 |
| 3 | Read Only | Read Only | 1 | 0 |
| 4 | Read Only | Read Only | 2 | 0 |
| ... | | | | ... |

COMPUTER AND DUMPING CONTROL METHOD

CROSS-REFERENCE TO RELATED APPLICATION

This application is based upon and claims the benefit of priority of the prior Japanese Patent Application No. 2013-164190, filed on Aug. 7, 2013, the entire contents of which are incorporated herein by reference.

FIELD

The embodiments discussed herein are related to a technique of dumping, in which data in a memory device is output.

BACKGROUND

In a computer, data for a CPU (Central Processing Unit) serving as an arithmetic processing unit is stored in a main storage device (memory device). Contents of processes executed by the CPU have been reflected on data stored in the main storage device. Accordingly, when a failure has occurred, data stored in the main storage device serves as information useful for detecting the cause or the like of the failure that occurred. Because of this, some computers perform dumping, in which data in main storage devices is output, when a failure has occurred. In particular, many of computers that are expected to be highly reliable such as servers or the like perform dumping.

In a computer that performs dumping, the restarting due to the occurrence of a failure is performed after the dumping is completed. In recent years, the capacity of main storage devices mounted in computers has increased sharply. The capacity has become ten times greater or more than that in several years ago. Accompanying such an increase in the capacity of main storage devices, the period of time for dumping has also become longer sharply. Accordingly, in order to perform swifter restarting of computers in which a failure has occurred, it is preferable to complete dumping in a shorter period of time.

As an example of conventional computer that may complete memory dumping in a shorter period of time, there is a computer that immediately performs dumping targeting only an updated block by monitoring the main storage device in units of areas (blocks). This conventional computer performs, in case of the occurrence of a failure, dumping targeting only a block that has been updated after the last time of dumping. Because blocks as targets of dumping in case of the occurrence of a failure are limited as described above, the dumping may be completed in a shorter period of time than a case where dumping is performed for all pieces of data in a main storage device.

Patent document 1: Japanese Laid-open Patent Publication No. 2-85938

SUMMARY

According to an aspect of the embodiments, a computer includes a memory device and a circuitry. The circuitry is configured to monitor an update state in a prescribed period of time of a plurality of units of management of data stored in the memory device for each of the plurality of units, to select a target unit as a target of dumping that outputs data from among the plurality of units on the basis of a monitoring result of the update state, and to dump data corresponding to the selected target unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a conventional computer, when updating is performed, dumping of an updated block is performed upon the updating. Usually, there are many blocks in a main storage device and not a small number of blocks are updated in a unit time. Accordingly, in a conventional computer, an I/O (Input/Output) process for dumping in units of blocks i.e., a process of writing a block in the main storage device to an output destination storage occurs frequently.

This I/O process for dumping is not a process that is to be performed by a computer inherently. Frequent occurrence of an I/O process for dumping increases loads on a computer, substantially decreasing the processing speed of the CPU and access speeds of the main storage device and a storage device serving as an output destination of data. Thus, an increase in loads leads to a longer period of time for executing processes that are to be executed inherently. Accordingly, in order to reduce a period of time for performing dumping in case of occurrence of a failure, it is also preferable to reduce an increase in loads during a normal operation (while a computer is running).

Hereinafter, embodiments of the present invention will be explained in detail by referring to the drawings.

First Embodiment

Figure 1:
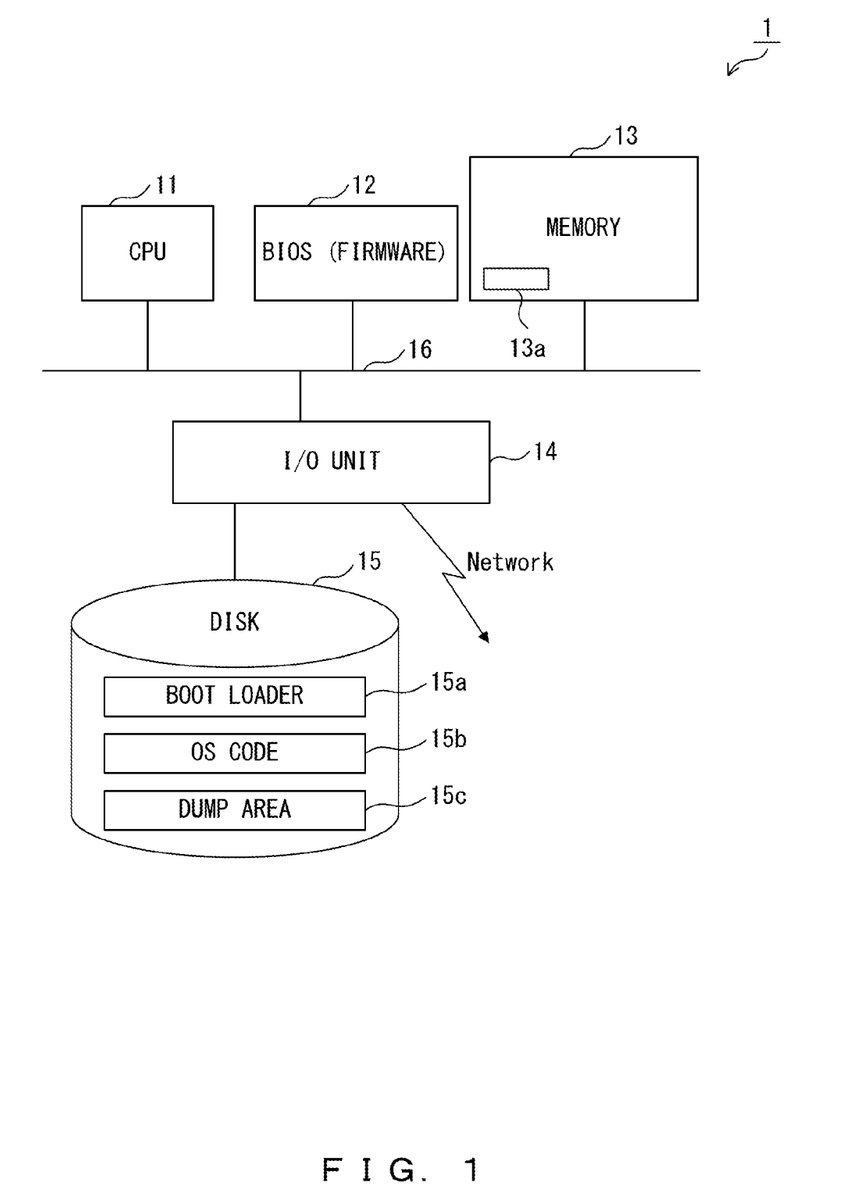
FIG. 1 illustrates a configuration example of a computer according to a first embodiment.

FIG. 1 illustrates a configuration example of a computer according to a first embodiment. As illustrated in FIG. 1, a computer 1 according to the first embodiment includes a CPU 11, a ROM (Read Only Memory) 12, a memory (memory module) 13, an I/O unit 14, a disk device 15 and a bus 16. The configuration of the computer 1 is not limited to the configuration example illustrated in FIG. 1.

The bus 16 connects the CPU 11, the ROM 12, the memory 13 and the I/O unit 14 to each other. The CPU 11 accesses the ROM 12 and the memory 13 via the bus 16 so as to control the I/O unit 14.

The CPU 11 performs a process by using the memory 13, which is the main storage device, as a work area. When a failure (abnormality or the like) has occurred, the CPU 11 performs dumping in which all data stored in the memory 13 is output.

The ROM 12 stores a Basic Input/Output System (BIOS) as firmware. The CPU 11 reads the BIOS from the ROM 12 to the memory 13 upon the turning on of the power, and executes the read BIOS.

The I/O unit 14 is an interface for the connection of a storage, communications via a network, etc. The I/O unit 14 outputs to the connected disk device 15 a command generated in accordance with an instruction from the CPU 11. Thereby, the CPU 11 accesses the disk device 15 via the bus 16 and the I/O unit 14.

The disk device 15 is a storage using for example a magnetic disk as a storage medium, and stores various programs including a boot loader 15a and an Operating System (OS) 15b and various data. This disk device 15 is an output destination of data in the memory 13 when dumping is performed, and a dump area 15c is secured for storing data in the memory 13. An output destination of data of dumping may be a storage that may be accessed by a network.

The CPU 11 that has started the execution of the BIOS reads the boot loader 15a stored in the disk device 15 via the bus 16 and the I/O unit 14 and executes it. The boot loader 15a reads the OS 15b from the disk device 15. The OS 15b is activated by being read from the disk device 15.

The computer 1 whose configuration example is illustrated in FIG. 1 is used as a server that provides for example services to a user of a terminal device connected via a network. When used as a server, the OS 15b reads an application program for providing a service (referred to as "application" hereinafter) from the disk device 15, and activates it.

The OS 15b supports virtual storage. The CPU 11 that executes the OS 15b divides data stored in the disk device 15 into units of management, and writes data to the memory 13 for each unit of management. In this embodiment, attention is paid to this, and dumping is performed in units of management as necessary.

In this example, a "page" is assumed as a unit of management. A unit of management may be a segment. It is also possible to set a unit of management that is different from virtual storage. It may be an area set in the memory 13. A plurality of types of units of management may exist. Accordingly, units of management are not limited particularly.

Figure 2:
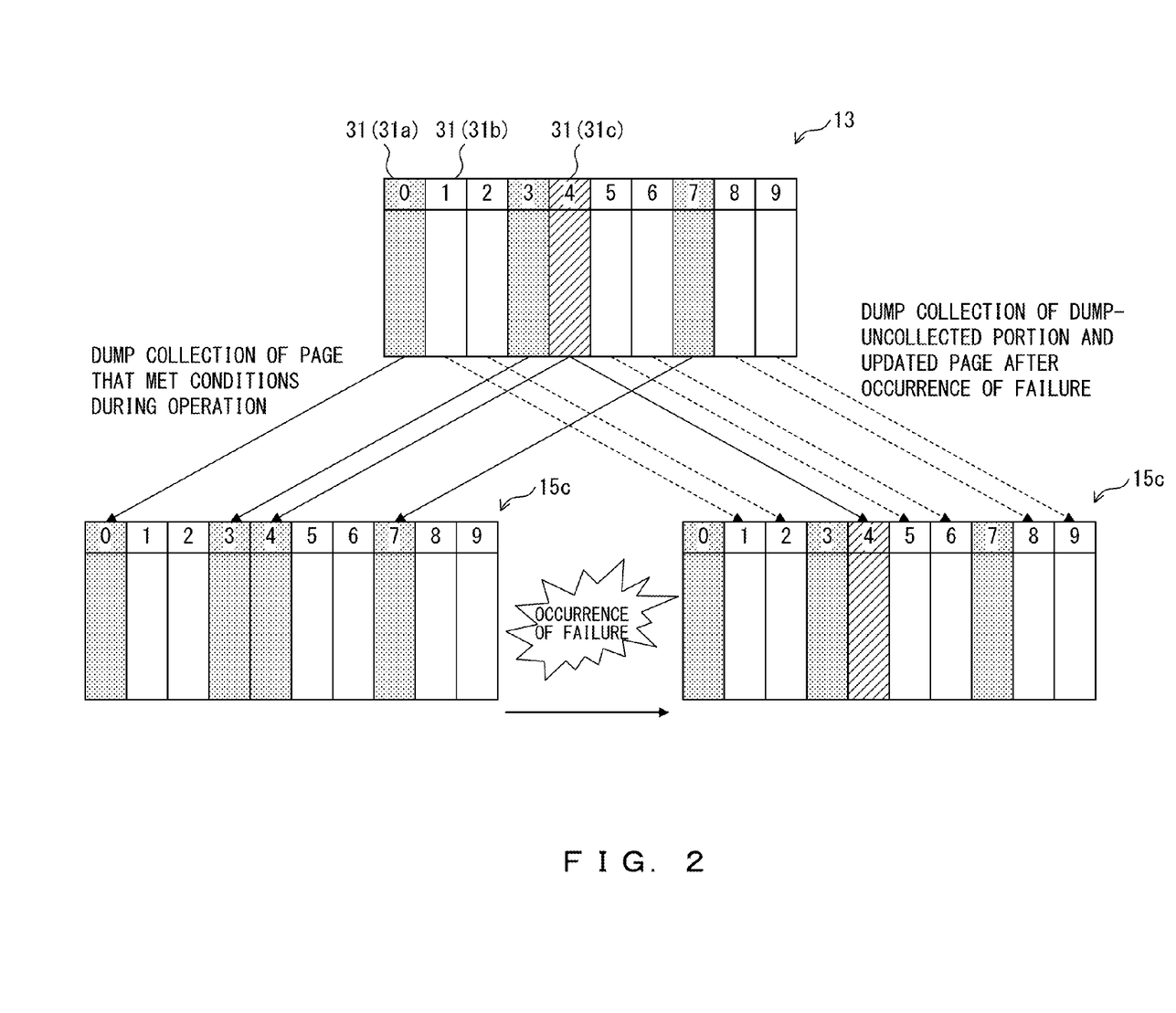
FIG. 2 illustrates a dumping method in units of pages according to the first embodiment.

FIG. 2 illustrates a dumping method in units of pages according to the first embodiment. Next, by referring to FIG. 2, specific explanations will be given for a dumping method executed in units of pages.

Values "0" through "9" in FIG. 2 represent page numbers assigned to pages as identification information. "31" represents a page stored in the memory 13. When a failure has occurred due to abnormality or the like, the state of the page 31 is categorized into three types. "31a" through "31c" are used for explicating the state of the page 31.

According to the first embodiment, data is dumped from the page 31 in the memory 13 when update is performed during an operation (while running). Accordingly, when a failure has occurred, the page 31 in the memory 13 is in one of a state where updated has not been performed after the last dumping (referred to as a "dumped state hereinafter), a state where dumping has not been performed at all (referred to as a "not dumped state" hereinafter) and a state where update has been performed after the last dumping (referred to as a "re-updated state" hereinafter). 31a represents the page 31 in a dumped state, 31b represents the page 31 in a not dumped state and 31c represents the page 31 in a re-updated state.

When a failure has occurred, the page 31a in a dumped state is not treated as a target of dumping because data thereof has already been stored. Targets of dumping are limited to the page 31b in a not dumped state and the page 31c in a re-updated state. Accordingly, dumping of the memory 13 in case of the occurrence of a failure may be completed in a shorter period of time than in a case of dumping all data.

Figure 3:
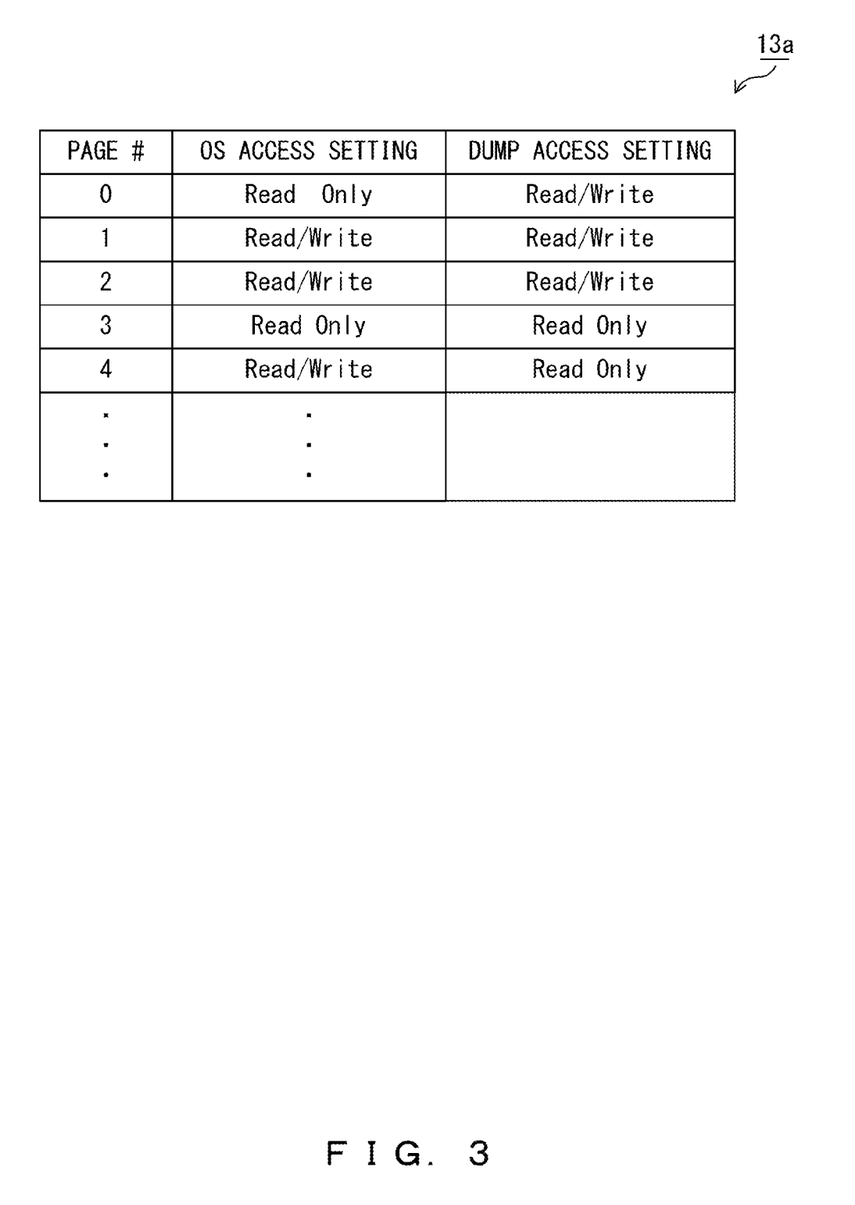
FIG. 3 illustrates a configuration example of a memory management table.

The CPU 11 uses a memory management table 13a stored in the memory 13 so as to manage the page 31 in the memory 13. Each entry (record) in the memory management table 13a stores a page number, OS access setting data and dump access setting data as illustrated in FIG. 3.

OS access setting data represents access contents that are permitted for the page 31 to which the page number in the same entry has been assigned. "Read Only" (referred to as "RO" hereinafter) written as OS access setting data in FIG. 3 represents that only reading is permitted. "Read/Write" represents that both reading and writing (updating) are permitted.

Dump access setting data represents whether or not the page 31 to which the page number stored in the same entry is assigned has been updated. "Read Only" (referred to as "RO" hereinafter) written as dump access setting data in FIG. 3 represents that updating has not been performed. "Read/Write" (referred to as "RW" hereinafter) represents that updating has been performed.

The CPU 11 refers to the memory management table 13a and confirms whether or not the OS access setting data for the page 31 to be updated is RW when it updates the page 31 in the memory 13. When the OS access setting data is RO, the CPU 11 updates the OS access setting data to RW, and thereafter updates the page 31. The dump access setting data for the page 31 to be updated is changed to RO when is not RW. Thereby, according to the first embodiment, dumping is performed on the page 31 having RW as the dump access setting data during an operation and when a failure has occurred.

In the first embodiment, the initial value of the dump access setting data is RW. Thereby, in the first embodiment, the page 31 that has been copied onto the memory 13 is dumped immediately. The purpose in this is to suppress the number of the pages 31 that becomes targets of dumping when a failure has occurred because the pages are not updated after being copied onto the memory 13. Accordingly, in the first embodiment, when a failure has occurred, most of the pages 31 that are targets of dumping are pages 31c in a re-updated state. The page 31b in a not dumped state is the page 31 in which a failure has occurred after copying the page onto the memory 13 and before dumping it.

The CPU 11 generates the memory management table 13a in the memory 13 by using the OS 15b. Data in the disk device 15 that is read to the memory 13 is divided in units of pages 31 and page numbers are assigned to the respective pages 31.

In the memory management table 13a, entries that may register all the pages 31 are secured, and the respective pages are registered in different entries in the memory management table 13a. Each entry stores the page number of the corresponding page 31, OS access setting data defined as initial setting data and dump access setting data defined as initial setting data. The generating of the memory management table 13a and the updating of the generated memory management table 13a are performed for example under control of the kernel, which is the core of the OS 15b.

Figure 4:
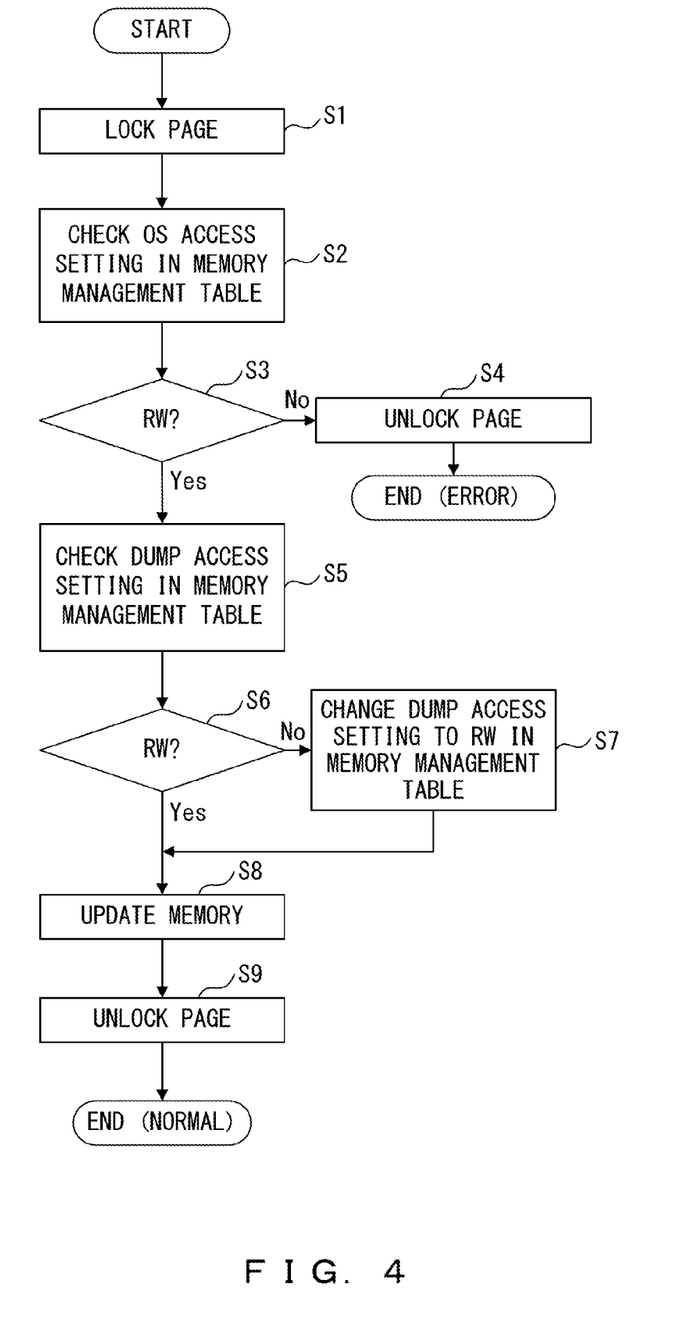
FIG. 4 is a flowchart of a memory write process.
Figure 5:
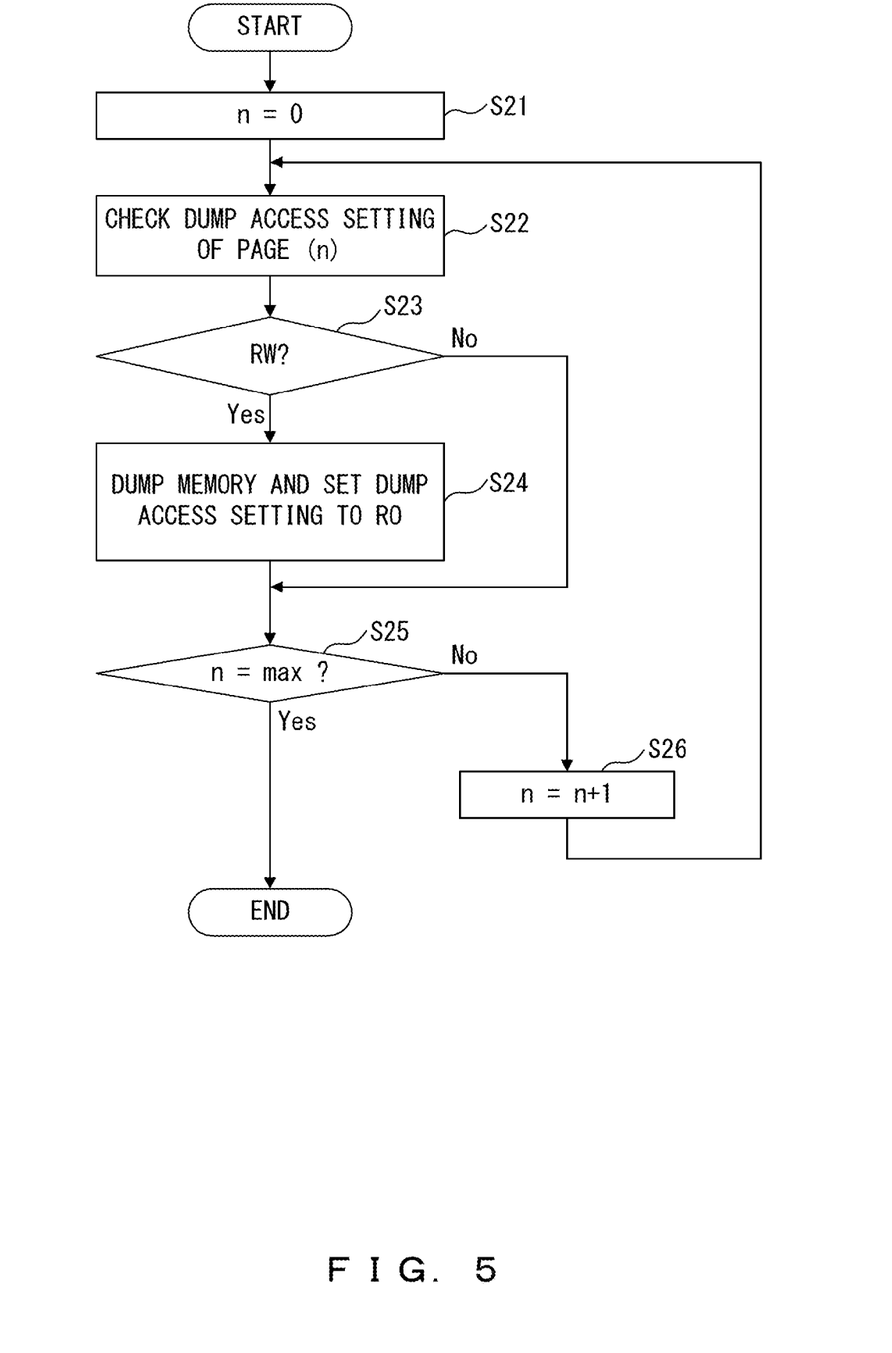
FIG. 5 is a flowchart of a dump process during an operation.
Figure 6:
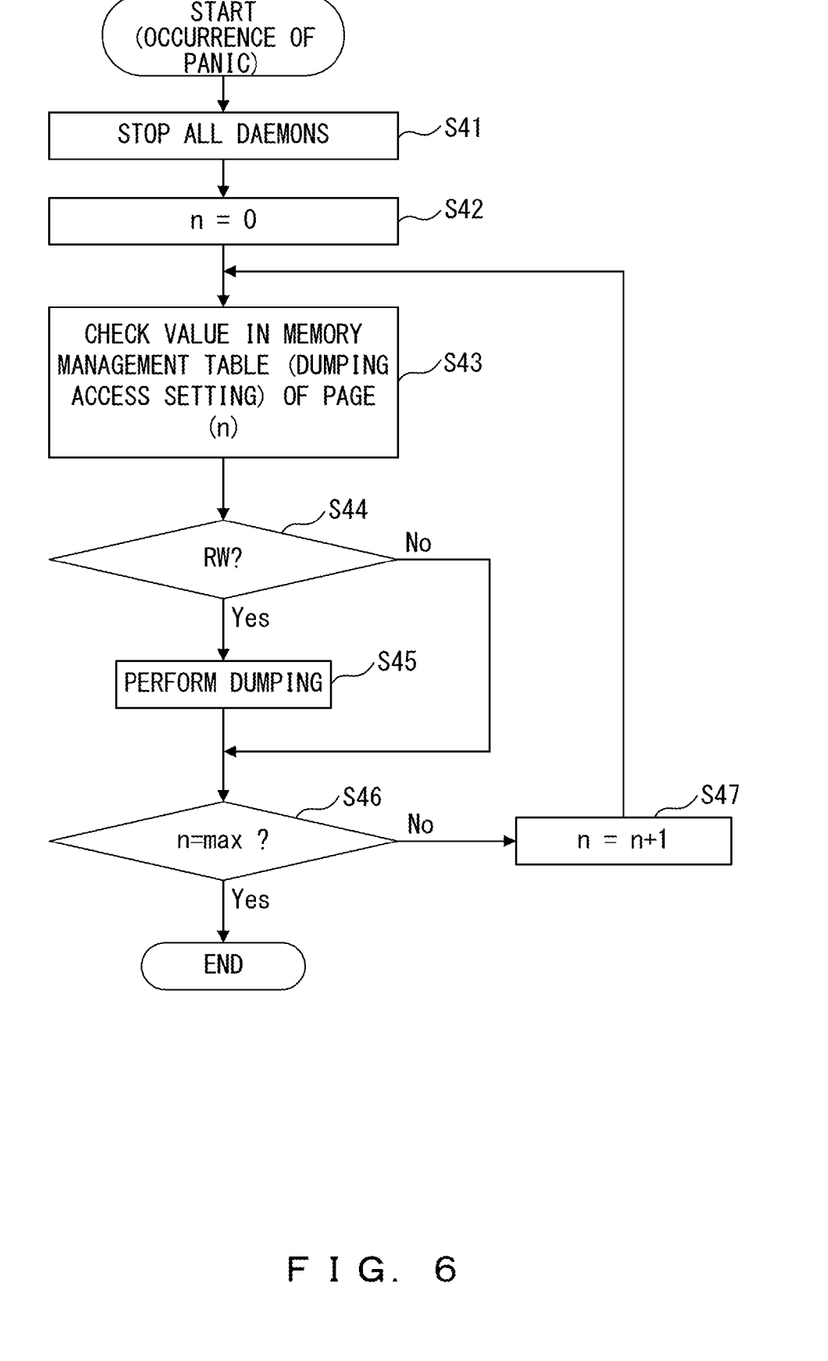
FIG. 6 is a flowchart for a dump process performed in case of the occurrence of a failure.

Hereinafter, the flowcharts of the respective processes illustrated in FIG. 4 through FIG. 6 are referred to so as to explain in detail the operations related to dumping performed by the CPU 11.

FIG. 4 is a flowchart of a memory write process. This memory write process is a result of extraction from a series of processes executed by the CPU 11 when a write process of updating the page 31 in the memory 13 is performed, and is started in response to for example a request from an application program to the OS 15b. This memory write process itself is implemented by the CPU 11 executing the kernel of the OS 15b. First, FIG. 4 is referred to so as to give detailed explanations for the memory write process.

First, the CPU 11 locks the page 31 for which writing has been requested by the application program (referred to as a "requested page" hereinafter), and prohibits other accesses to that requested page 31 (S1). Next, the CPU 11 refers to the memory management table 13a so as to check the OS access setting data of the requested page 31 (S2), and determines whether or not that OS access setting data is RW (S3). When that OS access setting data is RW, the determination result in S3 is YES, and the process proceeds to S5. When the OS access setting data is RO, the determination result in S3 is NO, and the process proceeds to S4.

In S4, the CPU 11 cancels the lock of the requested page 31 i.e., unlocks that requested page 31. Thereafter, this memory write process is terminated without updating the requested page 31. Because the requested page 31 is not updated, this termination is error termination.

In S5, the CPU 11 refers to the memory management table 13a and checks the dump access setting data of the requested page 31. Next, the CPU 11 determines whether or not that dump access setting data is RW (S6). When that dump access setting data is RW, the determination result in S6 is YES, and the process proceeds to S8. When that dump access setting data is RO, the determination result in S6 are NO, and the process proceeds to S7.

In S8, the CPU 11 writes data requested by the application program to the requested page 31 in the memory 13. The CPU 11 that has updated the requested page 31 by this data writing unlocks the requested page 31 (S9). After the requested page 31 is unlocked and other accesses to the requested page 31 are permitted, this memory write process is terminated. This termination is normal termination because the requested page 31 is updated.

In S7, to which the process proceeds when the determination result in S6 is NO, the CPU 11 changes the dump access setting data of the requested page 31 from RO to RW, and updates the memory management table 13a. Thereafter, the CPU 11 makes the process proceed to S8, and updates the requested page 31.

As described above, the dump access setting data of the page 31 in the memory 13 becomes RW when the updating by writing has been performed. Accordingly, the updated page 31 becomes a target of dumping.

FIG. 5 is a flowchart of a dump process during an operation. This dump process is a process for dumping a page for which dump access setting data is RW during an operation, and is executed for example each time a prescribed period of time (referred to as a "dump interval" hereinafter) has elapsed. This dump process itself is executed by the CPU 11 executing a program that is included in the OS 15b and that are resident in the memory 13 (referred to as a "dump daemon" hereinafter). Next, detailed explanations will be given for a dump process during an operation by referring to FIG. 5.

First, the CPU 11 assigns zero to variable n (S21). This variable n manages the target page 31 for confirming whether or not to perform dumping, and the page 31 having the value of variable n as its page number is selected as the target page 31. In FIG. 5, the target page 31 is denoted by "page (n)".

Next, the CPU 11 refers to the memory management table 13a, checks the dump access setting data for the target page 31 (S22) and determines whether or not that dump access setting data is RW (S23). When that dump access setting data is RW, the determination result in S23 is YES, and the process proceeds to S24. When that dump access setting data is RO or the target page 31 does not exist in the memory 13, the determination result in S23 is NO and the process proceeds to S25.

In S24, the CPU 11 performs dumping of writing the target page 31 to the dump area 15c in the disk device 15 via the bus 16 and the I/O unit 14, and changes the dump access setting data of the target page 31 from RW to RO. Thereafter, the process proceeds to S25.

In S25, the CPU 11 determines whether or not the value of variable n is equal to the maximum value among page numbers (denoted by "max" in FIG. 5). When the value of variable n is equal to the maximum value among page numbers, the determination result in S25 is YES, and the dump process during an operation is terminated. When the value of variable n is not equal to the maximum value among page numbers, i.e., when the value of variable n is smaller than the maximum value among page numbers, the determination result in S25 is NO, and the CPU 11 increments the value of variable n (S26). After the value of variable n is incremented, the process returns to S22.

When a dump process during an operation is executed as described above, all the pages 31 for which the dump access setting data is RW among the pages 31 in the memory 13 are dumped. As described above, the dump access setting data of the updated page 31 among the pages 31 in the memory 13 is RW. Accordingly, the updated page 31 in the memory 13 is dumped by the dump process during an operation that is first executed after the update.

FIG. 6 is a flowchart for a dump process performed in case of the occurrence of a failure. This dump process is a process for dumping the memory 13 when a failure has occurred. This is implemented for example by the CPU 11 executing the kernel of the OS 15b. Lastly, by referring to FIG. 6, detailed explanations will be given for a dump process in case of the occurrence of a failure.

First, the CPU 11 stops all programs, in the OS 15b, that are resident in the memory 13 ("daemon" in FIG. 6) (S41). Next, the CPU 11 substitutes zero to variable n (S42). Thereafter, the CPU 11 refers to the memory management table 13a, checks the dump access setting data of the target page 31 to which the value of variable n has been assigned as a page number (S43), and determines whether or not that dump access setting data is RW (S44). When that dump access setting data is RW, the determination result in S44 is YES and the process proceeds to S45. When that dump access setting data is RO or the target page 31 does not exist in the memory 13, the determination result in S44 is NO and the process proceeds to S46.

In S45, the CPU 11 performs dumping of writing the target page 31 to the dump area 15c in the disk device 15. After performing that dumping, the CPU 11 determines whether or not the value of variable n is equal to the maximum value among page numbers (S46). When the value of variable n is equal to the maximum value among page numbers, the determination result in S46 is YES, and a dump process in case of the occurrence of a failure is terminated. When the value of variable n is not equal to the maximum value among page numbers, i.e., when the value of variable n is smaller than the maximum value among page numbers, the determination result in S46 is NO, and the CPU 11 increments the value of variable n (S47). After the value of variable n is incremented, the process returns to S43.

As described above, when a failure has occurred, all the pages 31 for which the dump access setting data is RW in the pages 31 in the memory 13 are dumped.

Second Embodiment

In the above first embodiment, the updated page 31 is dumped immediately after the update. In a second embodiment, an update state in a prescribed period of time (referred to as a "monitoring period" hereinafter) is monitored for each of the pages 31 and whether or not to perform dumping of each of the page 31 is determined individually by using results of the monitoring.

A configuration of a computer according to the second embodiment is the same as that of the computer 1 according to the first embodiment. The operations thereof are also basically the same as those in the first embodiment. Accordingly, explanations for the second embodiment will be given by giving attention only to portions that are different from the first embodiment and by using the same numerals used in the first embodiment.

In the first embodiment, the updated page 31 is dumped by a dump process during an operation (FIG. 5) that is executed immediately after the update. Accordingly, the number of times of dumping of each of the pages 31 in a unit time increases as the frequency of updating increases. In dumping, accesses have to be made to the memory 13 and the disk device 15. Accordingly, the greater the number of the pages 31 with high updating frequency becomes and the higher the frequency of updating per each of the pages 31 becomes, the more resources the I/O processes for the dumping are consumed, substantially leading to reduction in the access speeds to the memory 13 and the disk device 15.

A dump process during an operation (dump daemon) is activated by for example the elapse of a dump interval as described above. A period of time that is set as the above monitoring period is a period of time that is longer than the above dump interval. When such a period of time is set as a monitoring period, a dump implementation interval between dumping the respective pages 31 and performing the next dumping has a length in units of the monitoring period. The minimum dump implementation interval is equal to or longer than a monitoring period. Accordingly, when a monitoring period is set and dumping is to be performed for the respective pages 31 by using a monitoring result in that monitoring period, the number of the pages 31 to be dumped in a time unit will be reduced in comparison with the first embodiment. As a result of this, the resource consumed by I/O processes for dumping during an operation is suppressed, which also leads to the suppression of substantial reduction in the access speeds to the memory 13 and the disk device 15. When a failure has occurred, it is possible to complete the dumping of the entire pages in a shorter time because of the existence of the pages 31 dumped during an operation.

In the second embodiment, dumping of the page 31 is performed under the condition that update has not been performed after updating and before a dump process during an operation is implemented four times. Because of that condition, the monitoring period is a period of time that has elapsed since the update of the page 31 and the maximum monitoring period thereof satisfies the relationships "three times of dump interval"<"maximum monitoring period"<"four times of dump interval". The minimum period satisfies "minimum monitoring period"<"dump interval".

The above condition is set for excluding the pages 31 having high update frequencies in a unit time from dumping targets and for dumping the page 31 that may be expected to have a high possibility of not being updated. In the second embodiment, by this condition, the page 31 that may be expected to have a stability, which is a degree that an updated state continues, that is relatively high is treated as a target of dumping during an operation.

The page 31 having a high update frequency in a unit time and the page 31 having a relatively low stability are highly likely to be updated immediately after dumping. Accordingly, these pages 31 are highly likely to become targets of dumping when a failure has occurred. Accordingly, even when these pages 31 are excluded from targets of dumping during an operation, there is a high possibility that a large increase in the number of the pages 31 that have to be dumped in case of the occurrence of a failure is avoided. Accordingly, it can be expected that dumping of all of the pages 31 that have to be treated as targets during the occurrence of a failure is performed in a period of time that is roughly the same as in the first embodiment. During an operation, these pages 31 are excluded from targets of dumping, and accordingly it can be expected that resources consumed by I/O processes of dumping can be suppressed much more than in the first embodiment.

Also, in the second embodiment, a monitoring period is reset by updating of the page 31 so as to change the monitoring period, however, the monitoring period may be fixed. When a fixed monitoring period is employed, it is also possible to determine whether nor not to dump the page 31 on the basis of the update frequency or the update interval or the like of the page 31 in a monitoring period by for example setting a relatively long period as the monitoring period. When a fixed monitoring period is to be employed, it is desirable that the pages 31 be divided into a plurality of groups and dumping be performed on the respective groups at different timings in order to suppress an increase in the loads of I/O processes due to dumping during an operation.

Figure 7:
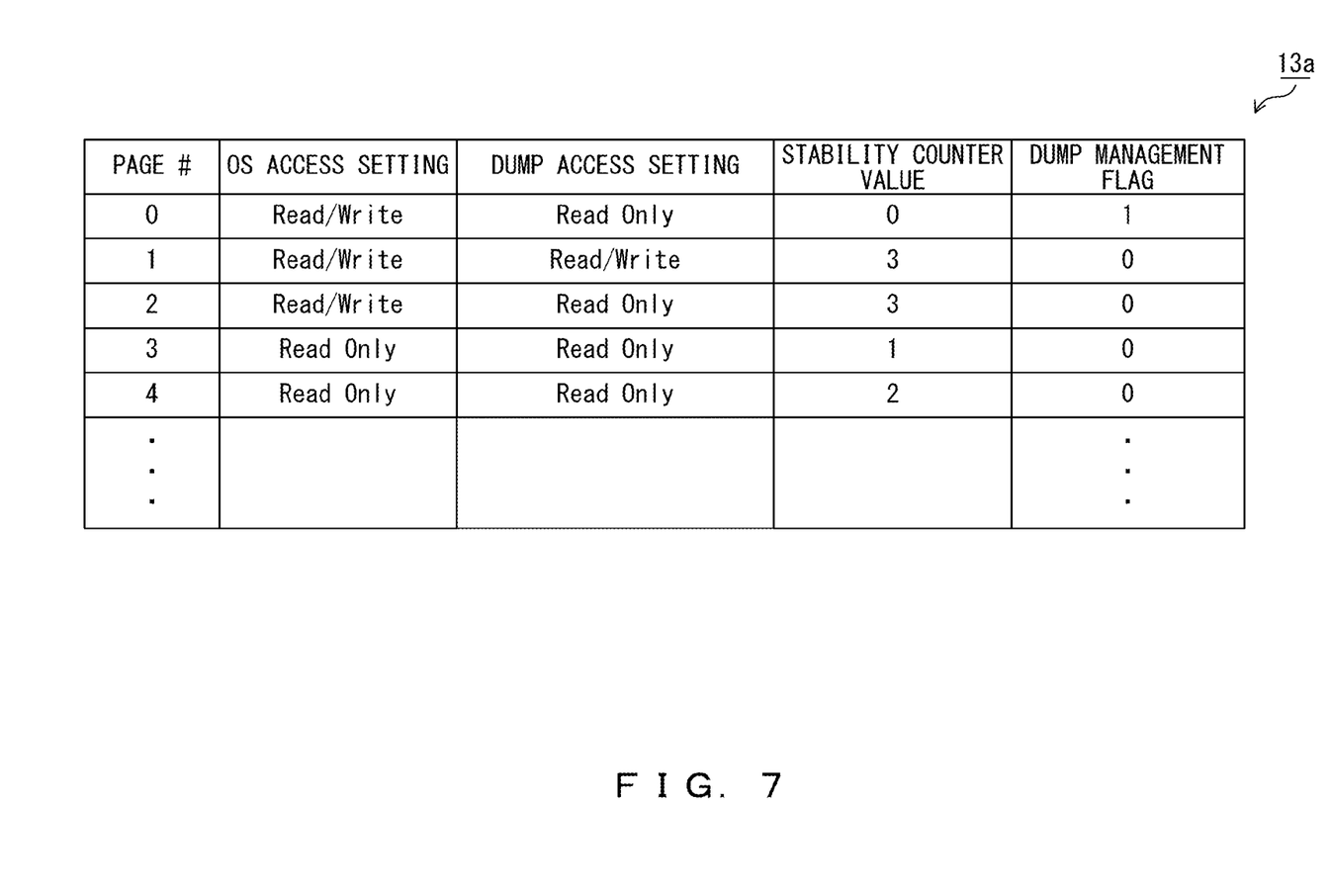
FIG. 7 illustrates a configuration example of a memory management table (second embodiment)

FIG. 7 illustrates a configuration example of a memory management table according to the second embodiment. As illustrated in FIG. 7, each entry in the memory management table 13a stores pieces of data respectively of a stability counter value and a dump management flag in addition to a page number, OS access setting data and dump access setting data.

Similarly to the first embodiment, dump access setting data represents whether or not the page 31 to which the page number stored in the same entry is assigned has been updated. As the initial value (initial setting data), "RW" is set.

A dump management flag is data representing whether or not dumping has been performed after updating. "1" represents that dumping has been performed and "0" represents that dumping has not been performed. The initial value is "0".

Also in the second embodiment, when the page 31 in the memory 13 is updated, the memory write process illustrated in FIG. 4 is executed and the dump access setting data for the page 31 to be updated is changed from RO to RW. The dump daemon according to the second embodiment extracts an entry for which the dump access setting data is RW from among entries in the memory management table 13a and changes the dump access setting data from RW to RO. Also, the dump daemon changes the stable counter value and the dump management flag in the extracted entry into zero, respectively. Note that because the dump management flag is zero in the page 31 that has been re-updated before dumping, the dump management flag before updated is zero in some cases.

A stability counter value is data representing a period of time that has elapsed after the page 31 was updated. The stability counter value of an entry for which a dump management flag is zero is incremented by the activated dump daemon. As described above, because the stability counter value is reset to zero by the updating of the page 31, the stability counter value represents a period of time that has elapsed after the page 31 was updated in units of dump intervals at which the dump daemon is activated.

The activated dump daemon increments a stability counter value that has not reached the maximum value. Accordingly, a stability counter value that has been changed to zero is also a target of the increment. As described above, the page 31 that becomes a dumping target is the page 31 that has not been again updated after the updating and before a dump process by dump daemon during an operation is implemented four times. Therefore, the above maximum value is three. Accordingly, the dumping target is the page 31 for which the dump access setting data is RO, the stability counter value is three and the dump management flag is zero.

In the memory management table 13a illustrated in FIG. 7, the dump access setting data is RW for the entry that stores "2" as the page number. The stability counter value and the dump management flag of that entry are three and zero, respectively. Thereby, it is understood that the page 31 to which "2" has been assigned as the page number is updated again after a check process (a dump process during an operation according to the second embodiment) was executed by a dump daemon three times.

Figure 8:
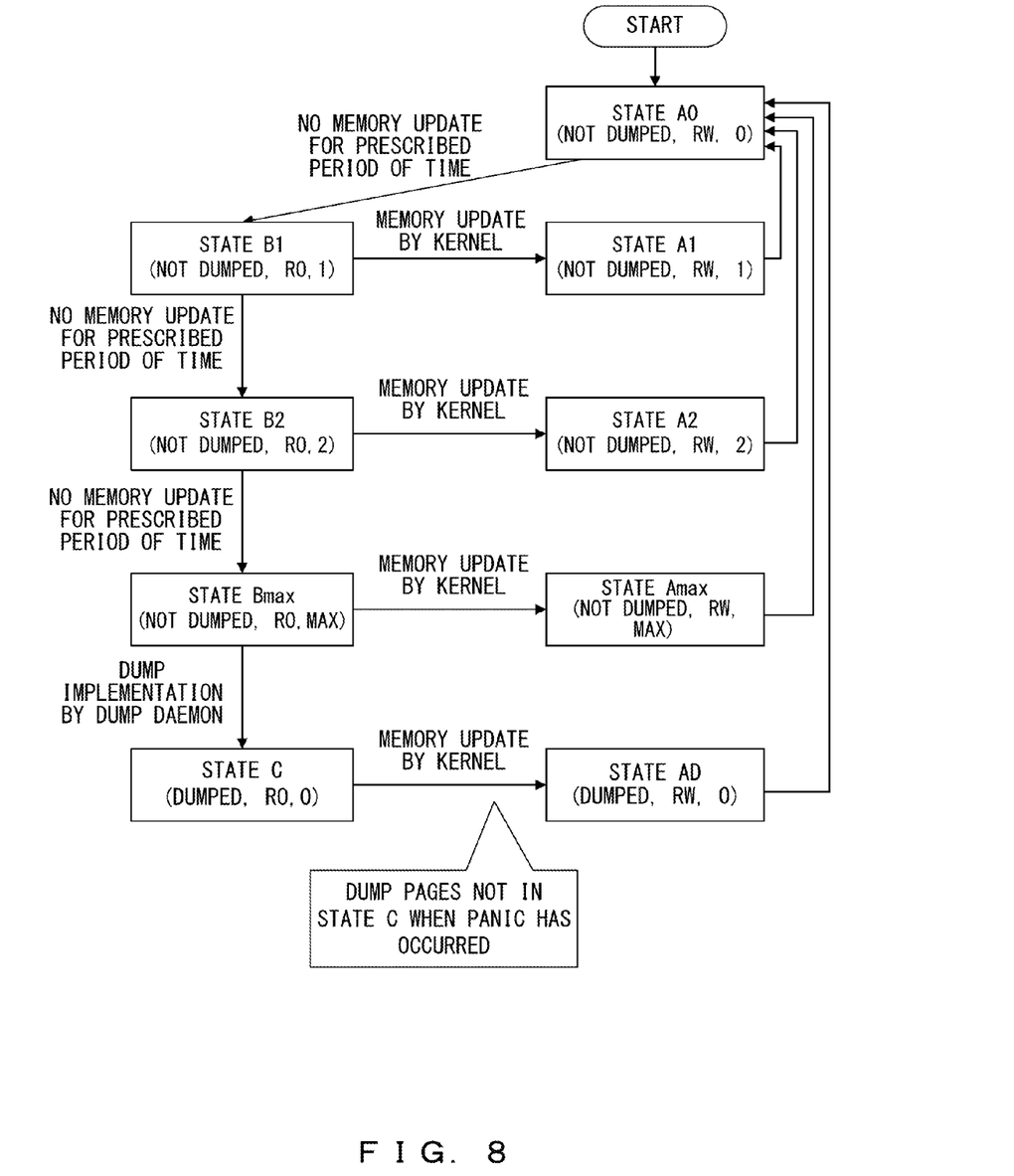
FIG. 8 illustrates an example of transition of page states.

FIG. 8 illustrates an example of transition of page states. As illustrated in FIG. 2, in the second embodiment, the page 31 in the memory 13 may be categorized into nine states i.e., states A0 through Ad, B1 through Bmax and C.

Each state has a pair of parentheses including three items. For example, state A0 has "(not dumped, RW, 0)". The first item in the parentheses represents the value of the dump management flag. "Not dumped" written as the content of the first item represents that the dump management flag is zero. "Dumped" represents that the dump management flag is "1".

The second item in the parentheses represents the content of the dump access setting data. "RW" written as the content of the second item represents that the dump access setting data is RW. "RO" represents that the dump access setting data is RO.

The third item in the parentheses represents the content of the stability counter value. "0" through "Max" written as the content of the third item represents the stability counter value. "Max" is three in the second embodiment as described above.

The page 31 copied onto the memory 13 is set to state A0, which is the initial setting. This page 31 transitions from state A0 to state B1, to state B2, to state Bmax and to state C by the stability counter value being incremented each time the dump daemon is activated unless it is updated. Due to the transition from state Bmax to state C, page 31 is dumped and the dump management flag and the stability counter value stored in the entry of that page 31 are updated to "1" and zero, respectively.

When the page 31 is updated during the transition from state A0 to state B1, to state B2 and to state Bmax, the page transitions to the state to which the page has to transition next in accordance with the updated state of the page 31. When the page 31 is updated in state B1, it transitions to state A1 next. When the page 31 is updated in state B2, it transitions to state A2, and when the page 31 is updated in state Bmax, it transitions to state Amax. The page 31 is updated in state C transitions to state Ad next. All of these transitions are implemented by the execution of the memory write process (kernel) illustrated in FIG. 4.

After the updating of the page 31, the dump daemon that is activated first makes the page 31 that is in one of states A1 through Amax and Ad transition to state A0. After making the page 31 transition to state A0, the dump daemon makes the page 31 transition to state B1 immediately. Accordingly, the page 31 made to transition to state A0 by the dump daemon transitions to state B1 before a dump interval elapses, unlike the case of copying.

During an operation, the page 31 transitions from a state to another as described above. Accordingly, during an operation, the page 31 is not dumped unless it transitions to state C. As a result of this, when a failure has occurred, all of the pages 31 that are in the states other than state C become targets of dumping.

In the second embodiment, the dump process during an operation and the dump process in case of the occurrence of a failure among the memory write process (FIG. 4), the dump process during an operation (FIG. 5) and the dump process in case of the occurrence of a failure (FIG. 6) explained in the second embodiment are different from those in the first embodiment. Hereinafter, by referring to FIG. 9 and FIG. 10, detailed explanations will be given for the dump process during an operation and the dump process in case of the occurrence of a failure according to the second embodiment.

Figure 9:
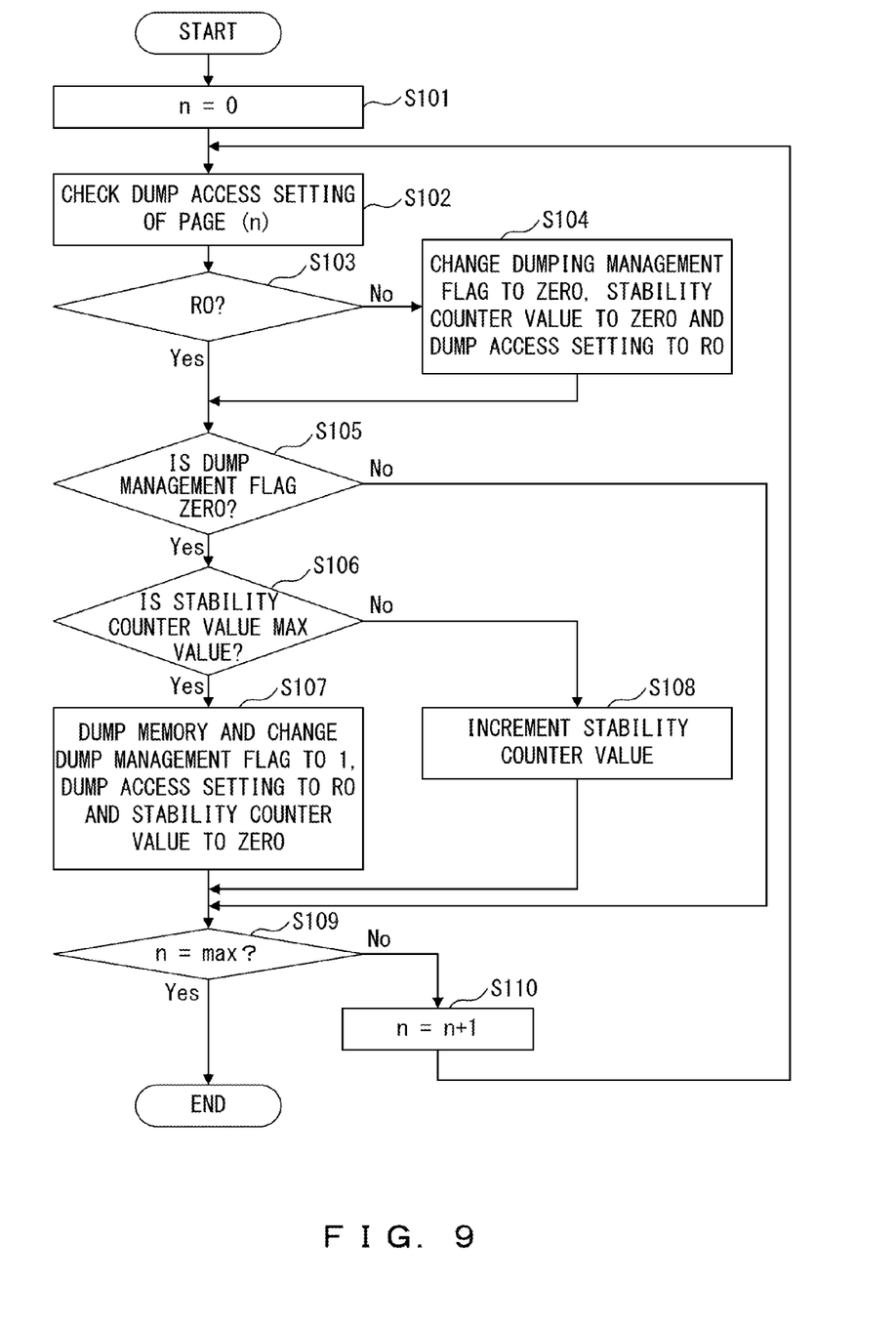
FIG. 9 is a flowchart for a dump process during an operation according to the second embodiment.

FIG. 9 is a flowchart for the dump process during an operation according to the second embodiment. First, by referring to FIG. 9, the dump process during an operation according to the second embodiment will be explained in detail.

First, the CPU 11 substitutes zero to variable n (S101). Next, the CPU 11 refers to the memory management table 13a, checks the dump access setting data of the target page 31 having the value of variable n as its page number (S102) and determines whether or not that dump access setting data is RO (S103). When that dump access setting data is RO, the determination result in S103 is YES, and the process proceeds to S105. When that dump access setting data is RW, the determination result in S103 is NO, and the process proceeds to S104.

In S104, the CPU 11 changes, in the target page 31, the dump management flag to zero, the stability counter value to zero and the dump access setting data to RO, respectively. Thereafter, the process proceeds to S105.

In S105, the CPU 11 determines whether or not the dump management flag of the target page 31 is zero. When that dump management flag is zero, the determination result in S105 is YES, and the process proceeds to S106. When that dump management flag is "1", the determination result in S105 is NO, and the process proceeds to S109.

In S106, the CPU 11 determines whether or not the stability counter value of the target page 31 is three (denoted by "MAX value" in FIG. 9). When the stability counter value is three, the determination result in S106 is YES, and the process proceeds to S107. When the stability counter value is smaller than three, the determination result in S106 is NO, and the process proceeds to S108.

In S107, the CPU 11 dumps the target page 31 and changes, in that target page 31, the dump management flag to "1", the dump access setting data to RO and the stability counter value to zero, respectively. Thereby, the target page 31 is made to transition to state C, and the process proceeds to S109.

In S108, the CPU 11 increments the stability counter value of the target page 31. Thereafter, the process proceeds to S109. The target page 31 that has received the process in S104 makes the stability counter value updated from zero to "1" in S108.

In S109, the CPU 11 determines whether or not the value of variable n is equal to the maximum value ("max" in FIG. 9) among the page numbers. When the value of variable n is equal to the maximum value among the page numbers, the determination result in S109 is YES, and the dump process during an operation according to the second embodiment is terminated. When the value of variable n is not equal to the maximum value among the page numbers i.e., when the value of variable n is smaller than the maximum value among the page numbers, the determination result in S109 is NO, and the CPU 11 increments the value of variable n (S110). After the value of variable n is incremented, the process returns to S102.

As described above, when a dump process during an operation is executed, only the pages 31 in state Bmax are dumped among the pages 31 in the memory 13 and the dumped pages 31 transition to state C. Accordingly, when a failure has occurred, the pages 31 in all the states except for state C become targets of dumping.

Figure 10:
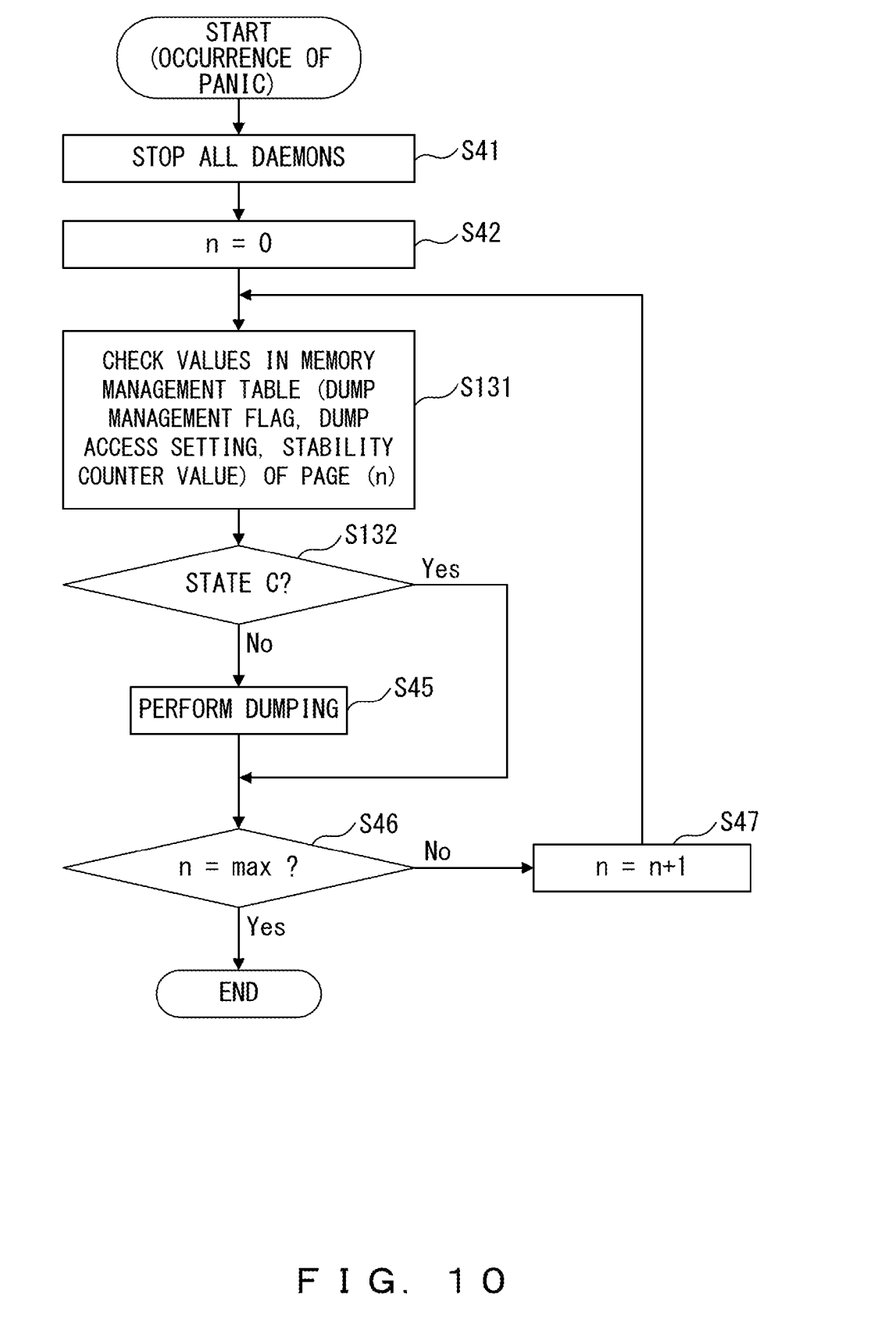
FIG. 10 is a flowchart for a dump process in case of the occurrence of a failure according to the second embodiment.

FIG. 10 is a flowchart for a dump process in case of the occurrence of a failure according to the second embodiment. By referring to FIG. 10, a dump process in case of the occurrence of a failure according to the second embodiment will be explained in detail.

In FIG. 10, process steps having the same contents as those in the first embodiment are denoted by the same numerals. In this example, explanations are given by paying attention to process steps having contents different from those in the first embodiment i.e., process steps denoted by numerals that do not appear in FIG. 6.

In the second embodiment, S131 is executed instead of S43. In S131, the CPU 11 refers to the memory management table 13a and checks the entry in the target page 31 to which the value of the variable n has been assigned as its page number. Next, the CPU 11 confirms whether or not that entry represents state C (S132). When, the dump management flag is "1", the dump access setting data is RO and the stability counter value is zero in that entry, the determination result in S132 is YES and the process proceeds to S46. When the dump management flag is zero and the dump access setting data is RW or the stability counter value is a value other than zero, the determination result in S132 is NO and the process proceeds to S45, and the CPU 11 dumps a target page.

According to the first or second embodiment, it is possible to realize dumping with reduced increase in the load on a computer in a normal operation (while the computer is running).

Note that the computer 1 according to the present embodiments (the first and second embodiments) is an information processing apparatus used as a server or the like. Computers to which the present embodiments may be applied are not limited to an information processing apparatus that may be used as a server or the like. Computers may be some devices or any kind of things that executes processes preferable for a system. Accordingly, computers may be devices that are included in some apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer comprising:
   a memory device; and
   a circuitry configured to monitor an update state in a prescribed period of time of a plurality of units of management of data stored in the memory device for each of the plurality of units, to select a target unit as a target of dumping that outputs data from among the plurality of units on the basis of a monitoring result of the update state, and to dump data corresponding to the selected target unit, wherein
   the circuitry excludes from the selection of the target unit as the target of dumping a certain unit which is included in the plurality of units when a prescribed period of time does not elapse since update of corresponding data of the certain unit.

2. The computer according to claim 1, wherein
   the circuitry performs the dumping on a unit of management other than a unit of management that has not been updated after being selected as the unit of target management among the units of management in the memory device when a failure has occurred.

3. A non-transitory computer-readable recording medium having recorded therein a control program that causes a computer accessible a memory device to execute a process comprising:
   monitoring an update state in a prescribed period of time of a plurality of units of management of data stored in the memory device for each of the plurality of units;
   selecting a target unit as a target of dumping that outputs data from among the plurality of units on the basis of a monitoring result of the update state; and
   dumping data corresponding to the selected target unit, wherein
   in the selecting, a certain unit which is included in the plurality of units is excluded from the selection of the target unit as the target of dumping when a prescribed period of time does not elapse since update of corresponding data of the certain unit.

4. A dumping control method that causes a computer accessible a memory device, the dumping control method comprising:
   monitoring an update state in a prescribed period of time of a plurality of units of management of data stored in the memory device for each of the plurality of units by a circuitry;

selecting a target unit as a target of dumping that outputs data from among the plurality of units on the basis of a monitoring result of the update state by the circuitry; and dumping data corresponding to the selected target unit by the circuitry, wherein in the selecting, a certain unit which is included in the plurality of units is excluded from the selection of the target unit as the target of dumping when a prescribed period of time does not elapse since update of corresponding data of the certain unit.

* * * * *